United States Patent [19]
Nishioka et al.

[11] Patent Number: 4,607,018
[45] Date of Patent: Aug. 19, 1986

[54] NON-REDUCIBLE TEMPERATURE COMPENSATION DIELECTRIC CERAMIC COMPOSITION

[75] Inventors: Goro Nishioka, Yahata; Yukio Sakabe, Kyoto, both of Japan

[73] Assignee: Murata Manufacturing Co., Ltd., Nagaokakyo, Japan

[21] Appl. No.: 680,462

[22] Filed: Dec. 11, 1984

[30] Foreign Application Priority Data

Dec. 19, 1983 [JP] Japan .................. 58-240642

[51] Int. Cl.$^4$ ............... C04B 35/48; C04B 35/49; C04B 35/50
[52] U.S. Cl. .................. 501/135; 264/61; 361/320; 361/321; 501/136
[58] Field of Search .......... 501/136, 135; 264/61; 361/321, 320

[56] References Cited

U.S. PATENT DOCUMENTS

| | | | |
|---|---|---|---|
| 3,153,179 | 10/1964 | Koenig et al. | 501/135 |
| 3,920,781 | 11/1975 | Eror et al. | 264/61 |
| 4,115,493 | 9/1978 | Sakabe et al. | 264/61 |
| 4,223,369 | 9/1980 | Burn | 361/321 |
| 4,260,663 | 4/1981 | Hagemann et al. | 501/136 |
| 4,357,426 | 11/1982 | Murata et al. | 501/136 |

FOREIGN PATENT DOCUMENTS

| | | | |
|---|---|---|---|
| 2047229 | 6/1971 | Fed. Rep. of Germany | 501/136 |
| 55-53803 | 4/1980 | Japan | 501/135 |
| 57-37081 | 8/1982 | Japan . | |
| 57-39001 | 8/1982 | Japan . | |

OTHER PUBLICATIONS

Hamer, The Viclan Ceramic Capacitor Handbook, Viclan Incorporated (1975), pp. 3-1 to 3-34.

Primary Examiner—Helen M. McCarthy
Attorney, Agent, or Firm—Finnegan, Henderson, Farabow, Garrett & Dunner

[57] ABSTRACT

A non-reducible temperature compensation dielectric ceramic composition is disclosed, comprising (Ca-Re)(ZrTi)O$_3$ and MnO$_2$ and represented by the formula:

$$(Ca_{1-x}Re_x)_m(Zr_{1-y}Ti_y)O_3 + zMnO_2$$

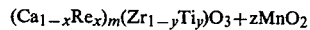

where Re is at least one of Nd, La, Sm and Ce, $0 < x < 0.3$, $0 \leq y < 0.2$, $0.85 < m < 1.30$, and $0.005 < z < 0.08$ (expressed as a weight ratio with the weight of $(Ca_{1-x}R_x)_m(Zr_{1-y}Ti_y)O_3$ as 1.00). The composition of the present invention is free from deterioration in insulation resistance and dielectric loss even if fired in a reducing atmosphere and can be fired over a wide temperature range of from 1,300° to 1,400° C. In production of capacitors using the composition of the present invention, inexpensive electrode materials such as nickel can be used and, thus, the composition of the present invention permits production of monolithic capacitor for temperature compensation.

2 Claims, No Drawings

NON-REDUCIBLE TEMPERATURE COMPENSATION DIELECTRIC CERAMIC COMPOSITION

FIELD OF THE INVENTION

The present invention relates to a non-reducible temperature compensation dielectric ceramic composition.

BACKGROUND OF THE INVENTION

Temperature compensation dielectric ceramic compositions that have been conventionally used are composed mainly of titanium oxide. In producing small-sized, large capacity temperature compensation ceramic capacitors using these conventional compositions, the electrodes are printed on green sheets. The green sheets are then superposed with each electrode separated by a green sheet, thereby producing a laminated body. This laminated body is then heat-pressed and fired in air at 1,200° to 1,400° C. to produce a monolithic capacitor.

In the monolithic capacitor described above, platinum or platinum-palladium alloys have been used as the electrode materials since they do not react with the dielectric ceramic compositions and are not oxidized even if fired in air at temperatures as high as 1,200° to 1,400° C. These metals, however, are expensive, and the cost of the electrode material occupies from 30 to 50% of the total production cost. Thus, the electrode material has constituted a serious obstacle to the production of inexpensive monolithic capacitors.

Substitution of inexpensive base metals such as nickel for the above expensive electrode materials is known. These metals, however, are oxidized when fired in air. Therefore, when these metals are used, firing must be carried out in a reducing atmosphere.

However, when conventional dielectric ceramic materials are fired in a reducing atmosphere, titanium oxide ($TiO_2$), rare earth oxides and the like are reduced. This leads to a serious reduction in electrical characteristics, such as insulation resistance and dielectric loss. As a result, the capacitor cannot be used for practical purpose.

In order to overcome the above problem, Japanese Patent Publication Nos. 37081/82 and 39001/82 disclose ceramic compositions composed mainly of calcium zirconate, which, even if fired in an inert or reducing atmosphere, retain a specific resistance of more than $10^{12} \Omega \cdot cm$ and a Q value of more than 3,000.

These compositions, however, have temperature coefficient of dielectric constant of up to +70 ppm/°C., but not the temperature coefficient of dielectric constant of up to +100 ppm/°C., especially up to +120 ppm/°C. at the operating temperatures generally encountered by temperature compensation ceramic capacitors. Furthermore, the compositions have a disadvantage in that sintering stability is poor; i.e., they can be fired only within the narrow temperature range of from 1,350° to 1,380° C.

SUMMARY OF THE INVENTION

The object of the present invention is to provide a non-reducible temperature compensation dielectric ceramic composition which is free from deterioration in insulation resistance and dielectric loss even if fired in an inert or reducing atmosphere, which has temperature characteristics of dielectric constant generally encountered by temperature compensation ceramic capacitors and which can be fired over a wider temperature range than conventional ceramic compositions.

The present invention relates to a non-reducible temperature compensation dielectric ceramic composition comprising (CaRe)(ZrTi)$O_3$ and $MnO_2$ and represented by the formula:

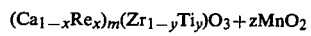

where
Re is at least one of Nd, La, Sm and Ce,
$0 < x < 0.3$,
$0 \leq y < 0.2$,
$0.85 < m < 1.30$, and
$0.005 < z < 0.08$ (expressed as a weight ratio with the weight of $(Ca_{1-x}Re_x)_m(Zr_{1-y}Ti_y)O_3$ as 1.00).

DETAILED DESCRIPTION OF THE INVENTION

The ceramic composition of the present invention comprises (CaRe)(ZrTi)$O_3$ and $MnO_2$ and can be represented by the formula:

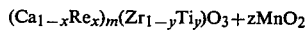

where all the symbols are as defined above.

The ranges set forth above for x, y, m and z are critical to achieving the advantages of the present invention. More specifically, if x is 0.30 or more, sintering properties seriously deteriorate and the Q value drops considerably. On the other hand, if x is 0, the desired temperature coefficient cannot be obtained, which also is a problem in Japanese Patent Publication No. 39001/82, and, furthermore, the firing temperature range is narrowed.

If y is 0.20 or more, the specific resistance decreases to as low as $10^{11} \Omega \cdot cm$ or less.

If m is 0.85 or less, the Q value drops considerably. On the other hand, if m is 1.30 or more, the resulting composition cannot be sufficiently sintered.

The weight ratio (z) of $MnO_2$ to $(Ca_{1-x}Re_x)_m(Zr_{1-y}Ti_y)O_3$ should be such that $0.005:1.00 < z < 0.08:1.00$. If the ratio is 0.005:1.00 or less, the Q value drops, whereas if it is 0.08:1.00 or more, the specific resistance is not more than $10^{10} \Omega \cdot cm$.

The present invention will now be described in greater detail with reference to the following non-limiting examples.

EXAMPLE 1

From 0.5 to 20 parts by weight of mineralizers such as calcium carbonate ($CaCO_3$), neodymium oxide ($Nd_2O_3$), lanthanum oxide ($La_2O_3$), samarium oxide ($Sm_2O_3$), cerium oxide ($CeO_2$), titanium dioxide ($TiO_2$), zirconium oxide ($ZrO_2$), manganese oxide ($MnO_2$) and silicon dioxide ($SiO_2$) were mixed to prepare ceramic compositions as shown in Table 1. Each composition was wet-mixed for 16 hours and then dried. The composition was calcined by raising its temperature at a rate of 150° C./hour in air and maintaining it at 1,000° to 1,200° C. for 2 hours. To this calcined composition, 5% by weight of vinyl acetate as a binder and pure water in an amount equal in weight to the composition were added, and the resulting mixture was wet-mixed for 16 hours. The mixture was dehydrated, dried, granulated into particles passing through a 60 mesh screen, and then pressed into a disc (diameter: 14.0 mm; thickness: 1.2 mm) under a pressure of 750 kg/cm². The temperature of the disc sample was raised at 150° C./hour and maintained at 500° C. for 2 hours to fire the binder. Thereafter, the temperature was raised at a rate of 150° C./hour in an inert (e.g., nitrogen) atmosphere or reducing [e.g., hydrogen/nitrogen (0.1 to 5% by volume), and carbon monoxide/nitrogen (0.1 to 5% by volume)] atmosphere, maintained at 1,350° C. for 2 hours, and then allowed to cool. When the temperature reached 300° C. or less, the gas supply was stopped, and the ceramic sample so obtained was removed.

A nickel paste containing a low melting glass frit, which contained from 20 to 30% by weight of lead but did not contain alkali, was coated on both sides of the above-produced ceramic sample and fired at 800° to 1,000° C. in an inert or reducing atmosphere to form electrodes. The capacitor sample so obtained was measured for electrical characteristics. The results are shown in Table 1.

The temperature coefficient of dielectric constant and Q value of Table 1 were values at 1 Vrms/1 MHz, and the specific resistance was measured after charging for 2 minutes at a voltage of 500 V/mmDC.

The temperature coefficient of dielectric constant was determined according to the following equation:

Temperature coefficient of dielectric constant (ppm/°C.) =

$$\frac{C_{85} - C_{25}}{C_{25}} \times \frac{1}{(85°\,C. - 25°\,C.)} \times 10^6$$

where
$C_{85}$ = dielectric constant at 85° C., and
$C_{25}$ = dielectric constant at 25° C.

In Table 1, Run Nos. 1 to 6 marked with the asterisk are compositions not falling within the scope of the present invention. The others are all examples of the present invention.

TABLE 1

| Run No. | Composition $(Ca_{1-x}Re_x)_m(Zr_{1-y}Ti_y)O_3$ Re:x | y | m | $MnO_2$ z (wt. ratio) | Dielectric Constant (1 MHz) | Temperature Coefficient of Dielectric Constant (1 MHz × ppm/°C.) | Q Value (1 MHz) | Specific Resistance ($\Omega \cdot$ cm) |
|---|---|---|---|---|---|---|---|---|
| 1* | Nd:0.20 | 0.10 | 1.00 | 0.005 | 25 | +70 | 500 | $>10^{12}$ |
| 2* | Nd:0.10 | 0.10 | 1.00 | 0.08 | 27 | +50 | 800 | $3 \times 10^9$ |
| 3* | Nd:0.15 | 0.10 | 0.85 | 0.01 | 26 | +60 | 300 | $\sim 10^{12}$ |
| 4* | Nd:0.15 | 0.10 | 1.30 | 0.03 | | Impossible to sinter | | |
| 5* | Nd:0.30 | 0.10 | 1.05 | 0.03 | 22 | +150 | 300 | $>10^{12}$ |
| 6* | Nd:0.10 | 0.20 | 1.10 | 0.03 | 27 | +30 | 700 | $\sim 10^{11}$ |
| 7 | Nd:0.01 | 0.10 | 1.00 | 0.03 | 28 | ±0 | 3,500 | $>10^{12}$ |
| 8 | Nd:0.20 | 0 | 1.00 | 0.05 | 26 | +100 | 3,700 | $>10^{12}$ |
| 9 | Nd:0.25 | 0.15 | 1.25 | 0.05 | 26 | +70 | 3,500 | $>10^{12}$ |
| 10 | Nd:0.15 | 0.15 | 1.20 | 0.03 | 28 | +60 | 3,000 | $>10^{12}$ |
| 11 | Nd:0.10 | 0 | 0.90 | 0.05 | 27 | +30 | 3,100 | $>10^{12}$ |
| 12 | Nd:0.20 | 0 | 1.20 | 0.03 | 25 | +100 | 3,800 | $>10^{12}$ |
| 13 | Nd:0.10 | 0 | 0.90 | 0.01 | 26 | +60 | 3,500 | $>10^{12}$ |
| 14 | Nd:0.25 | 0 | 1.00 | 0.07 | 28 | +120 | 3,000 | $>10^{12}$ |
| 15 | Nd:0.15 | 0 | 1.00 | 0.02 | 27 | +80 | 3,500 | $>10^{12}$ |
| 16 | La:0.15 | 0.1 | 1.00 | 0.05 | 26 | +60 | 3,800 | $>10^{12}$ |
| 17 | La:0.15 | 0.05 | 1.00 | 0.03 | 28 | +70 | 3,700 | $>10^{12}$ |
| 18 | La:0.15 | 0 | 1.00 | 0.02 | 25 | +70 | 3,000 | $>10^{12}$ |
| 19 | Sm:0.10 | 0.05 | 1.00 | 0.02 | 28 | +30 | 3,700 | $>10^{12}$ |
| 20 | Ce:0.10 | 0.10 | 1.00 | 0.02 | 27 | +50 | 3,800 | $>10^{12}$ |
| 21 | Nd:0.10 La:0.10 | 0.15 | 1.00 | 0.03 | 27 | +60 | 3,800 | $>10^{12}$ |

It can be seen from Table 1 that the composition of the present invention has desired temperature coefficient of dielectric constant between ±0 ppm/°C. and +120 ppm/°C.

EXAMPLE 2

A ceramic composition having the same formulation as that of Run No. 9 (an example of the present invention) of Example 1, i.e., $(Ca_{0.75}Nd_{0.25})_{1.25}(Zr_{0.85}Ti_{0.15})O_3 + MnO_2$ (0.05 part by weight) was prepared. This composition was processed in the same manner as in Example 1 and, thereafter, fired at 1,300° C. or 1,400° C. to produce the corresponding two samples (Run Nos. 9-1 and 9-2).

These ceramic samples were provided with electrodes in the same manner as in Example 1 and then measured for electrical characteristics also in the same manner as in Example 1. The results are shown in Table 2.

As a reference example, a conventional ceramic composition: $Ca_{0.9}ZrO_3 + MnO_2$ (0.02 part by weight) was fired at varied temperatures, and changes in its characteristics are shown in Table 3.

TABLE 2

$(Ca_{0.75}Nd_{0.25})_{1.25}(Zr_{0.85}Ti_{0.15})O_3 + MnO_2$ (0.05 part by weight)

| Run No. | Firing Temperature (°C.) | Dielectric Constant (1 MHz) | Temperature Coefficient of Dielectric Constant (1 MHz × ppm/°C.) | Q Value (1 MHz) | Specific Resistance ($\Omega \cdot$ cm) |
|---|---|---|---|---|---|
| 9-1 | 1,300 | 26 | +70 | 3,500 | $>10^{12}$ |
| 9-2 | 1,400 | 26 | +70 | 3,500 | $>10^{12}$ |

TABLE 3

| | $Ca_{0.9}ZrO_3$ + $MnO_2$ (0.02 part by weight) | | | | |
|---|---|---|---|---|---|
| | | | Electrical Characteristics | | |
| Run No. | Firing Temperature (°C.) | Dielectric Constant (1 MHz) | Temperature Coefficient of Dielectric Constant (1 MHz × ppm/°C.) | Q Value (1 MHz) | Specific Resistance (Ω · cm) |
| Reference Example 1 | 1,300 | | Impossible to sinter | | |
| Reference Example 2 | 1,370 | 32 | +70 | 3,200 | $>10^{12}$ |
| Reference Example 3 | 1,400 | 30 | +70 | 3,000 | $9 \times 10^{11}$ |

It can be seen from Tables 2 and 3 that the composition of the present invention has good sintering stability and can be fired over a wide temperature range of from 1,300° to 1,400° C., whereas the conventional ceramic composition can be fired only within a narrow temperature range of from 1,350° to 1,380° C.; outside this narrow range, the conventional ceramic composition cannot be sintered and the specific resistance drops.

With the composition of the present invention, a specific resistance of more than $10^{12}$ Ω·cm and a Q value of more than 3,000 can be obtained even if it is fired in an inert or reducing atmosphere. Furthermore, its dielectric constant is from 25 to 28 and desired temperature coefficient of dielectric constant can be obtained over a wide range of from ±0 ppm/°C. to +120 ppm/°C. The composition of the present invention can be fired over a wide temperature range of from 1,300° to 1,400° C. In production of monolithic capacitors using the composition of the present invention, inexpensive base metal materials such as nickel can be used as electrodes and, thus, the composition of the present invention permits production of inexpensive monolithic capacitor for temperature compensation.

While the invention has been described in detail and with reference to specific embodiments thereof, it will be apparent to one skilled in the art that various changes and modifications can be made therein without departing from the spirit and scope thereof.

What is claimed is:

1. A non-reducible temperature compensation dielectric ceramic composition consisting essentially of (CaRe) (ZrTi)$O_3$ and $MnO_2$ and represented by the formula:

$$(Ca_{1-x}Re_x)_m(Zr_{1-y}Ti_y)O_3 + zMnO_2$$

where
Re is at least one of Nd, La, Sm and Ce,
$0.01 \leq x \leq 0.25$;
$0 \leq y \leq 0.15$
$0.90 \leq m \leq 1.25$; and
$0.01 \leq z \leq 0.07$ (expressed as a weight ratio with the weight of $(Ca_{1-x}Re_x)_m(Zr_{1-y}Ti_y)O_3$ as 1.00).

2. A non-reducible temperature compensation dielectric ceramic composition consisting essentially of (CaRe) (ZrTi)$O_3$ and $MnO_2$ and represented by the formula:

$$(Ca_{1-x}Re_x)_m(Zr_{1-y}Ti_y)O_3 + zMnO_2$$

where
Re is at least one of Nd, La, Sm and Ce,
$0.01 \leq x \leq 0.25$;
$0 \leq y \leq 0.15$
$0.90 \leq m \leq 1.25$; and
$0.01 \leq z \leq 0.07$ (expressed as a weight ratio with the weight of $(Ca_{1-x}Re_x)_m(Zr_{1-y}Ti_y)O_3$ as 1.00) and wherein the value of x is sufficient to obtain a temperature coefficient of dielectric constant of between +0 ppm/°C. and +120 ppm/°C.

* * * * *

UNITED STATES PATENT AND TRADEMARK OFFICE
CERTIFICATE OF CORRECTION

PATENT NO. : 4,607,018

DATED : August 19, 1986

INVENTOR(S) : GORO NISHIOKA and YUKIO SAKABE

It is certified that error appears in the above-identified patent and that said Letters Patent is hereby corrected as shown below:

In Abstract, on line 8, change "$R_x$" to --$Re_x$--.

Signed and Sealed this

Twenty-first Day of April, 1987

Attest:

DONALD J. QUIGG

Attesting Officer      Commissioner of Patents and Trademarks